United States Patent
Lockett et al.

(10) Patent No.: US 10,272,619 B2
(45) Date of Patent: Apr. 30, 2019

(54) MANUFACTURE OF A RESIN INFUSED ONE-PIECE COMPOSITE TRUSS STRUCTURE

(71) Applicant: The Boeing Company, Chicago, IL (US)

(72) Inventors: Peter J. Lockett, Thornbury (AU); Manning J. Scarfe, Ascot Vale (AU); Andrew K. Glynn, Kensington (AU); David A. Pook, Malvern East (AU)

(73) Assignee: The Boeing Company, Chicago, IL (US)

( * ) Notice: Subject to any disclaimer, the term of this patent is extended or adjusted under 35 U.S.C. 154(b) by 630 days.

(21) Appl. No.: 14/281,305

(22) Filed: May 19, 2014

(65) Prior Publication Data
US 2015/0328845 A1 Nov. 19, 2015

(51) Int. Cl.
*B29C 70/44* (2006.01)
*B29C 70/54* (2006.01)
(Continued)

(52) U.S. Cl.
CPC ............ *B29C 70/443* (2013.01); *B29C 70/44* (2013.01); *B29C 70/446* (2013.01);
(Continued)

(58) Field of Classification Search
CPC ....... B29C 70/443; B29C 33/76; B29C 33/52; B29C 2043/3668
See application file for complete search history.

(56) References Cited

U.S. PATENT DOCUMENTS 3,041,719 A * 7/1962 Haseltine .............. B21C 37/151
138/111
3,658,612 A 4/1972 Corzine
(Continued)

FOREIGN PATENT DOCUMENTS

CN 1454277 A 11/2003
CN 103687788 A 3/2014
(Continued)

OTHER PUBLICATIONS

European Search Report for Related Application No. EP15165217.9; Report dated Sep. 15, 2015.
(Continued)

*Primary Examiner* — Matthew J Daniels
(74) *Attorney, Agent, or Firm* — Miller, Matthias & Hull LLP

(57) ABSTRACT

A composite truss structure may have a first facesheet, a second facesheet, and a plurality of truss elements joined with the first facesheet and the second facesheet at nodes to form a one-piece structure. The composite truss structure may be formed by a method comprising preparing a dry fabric mold by: 1) placing a first dry fabric layer on a tool, 2) placing a first layer of fabric-loaded mandrels on the first dry fabric layer, 3) placing a second layer of the fabric-loaded mandrels on the first layer of fabric-loaded mandrels, and 4) placing a second dry fabric layer over the fabric-loaded mandrels. The method may further comprise infusing the dry fabric mold with a resin, and curing the resin to provide the nonflexible composite truss structure.

21 Claims, 12 Drawing Sheets

(51) Int. Cl.
*B29D 24/00* (2006.01)
*B30B 15/06* (2006.01)
*B64C 1/06* (2006.01)
*B29K 105/08* (2006.01)

(52) U.S. Cl.
CPC .............. *B29C 70/543* (2013.01); *B29D 24/00* (2013.01); *B29D 24/002* (2013.01); *B30B 15/062* (2013.01); *B64C 1/06* (2013.01); *B29C 70/545* (2013.01); *B29K 2105/0827* (2013.01); *Y02T 50/43* (2013.01); *Y10T 428/24149* (2015.01)

(56) References Cited

U.S. PATENT DOCUMENTS

| | | | |
|---|---|---|---|
| 4,223,053 A | 9/1980 | Brogan | |
| 4,378,263 A | 3/1983 | Logan et al. | |
| 5,332,178 A * | 7/1994 | Williams | B29C 70/446 244/117 R |
| 5,904,972 A * | 5/1999 | Tunis, III | B29C 43/021 428/118 |
| 6,508,910 B2 | 1/2003 | Zhou et al. | |
| 6,511,567 B1 * | 1/2003 | Ruggie | E04C 2/3405 156/205 |
| 6,607,798 B1 * | 8/2003 | Watanabe | B29C 70/525 428/304.4 |
| 2010/0080942 A1 | 4/2010 | McCarville et al. | |
| 2011/0168324 A1 * | 7/2011 | Ender | B29C 33/301 156/243 |
| 2011/0315824 A1 | 12/2011 | Pook et al. | |
| 2012/0052247 A1 | 3/2012 | Pook et al. | |
| 2012/0119422 A1 | 5/2012 | Lockett et al. | |
| 2013/0020438 A1 * | 1/2013 | Glynn | B64C 1/061 244/129.1 |
| 2013/0264751 A1 | 10/2013 | Lockett et al. | |
| 2014/0117159 A1 | 5/2014 | Glynn et al. | |

FOREIGN PATENT DOCUMENTS

| | | |
|---|---|---|
| EP | 0967147 A2 | 12/1999 |
| EP | 0967147 B1 | 9/2003 |
| RU | 2396168 C2 | 8/2010 |
| WO | 1991014565 A1 | 10/1991 |

OTHER PUBLICATIONS

Chinese Office Action for Related Application No. 201510088050.4; Report dated Jun. 6, 2018.
GCC Examination Report for Related Application No. GC 2015-29406; Report dated Feb. 18, 2018.
Russian Office Action for related application No. 2015/102214; dated Aug. 16, 2018.
Australian Search Report for Related Application No. AU2015200451; Report dated Feb. 11, 2019.
European Search Report for Related Application No. EP18180371.9; Report dated Nov. 13, 2018.

* cited by examiner

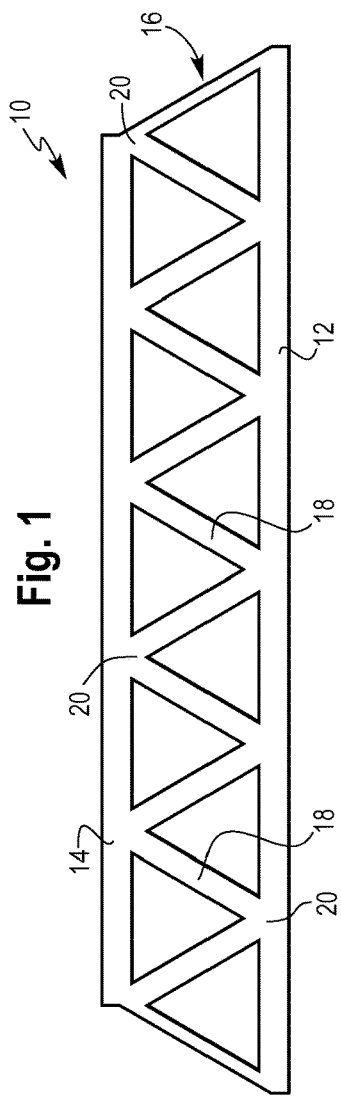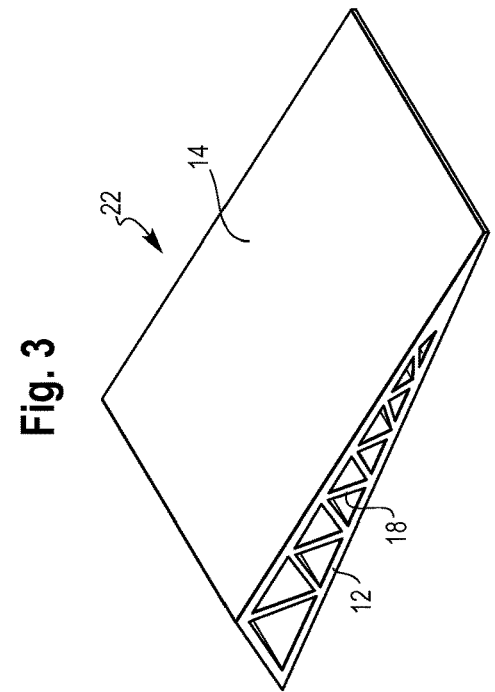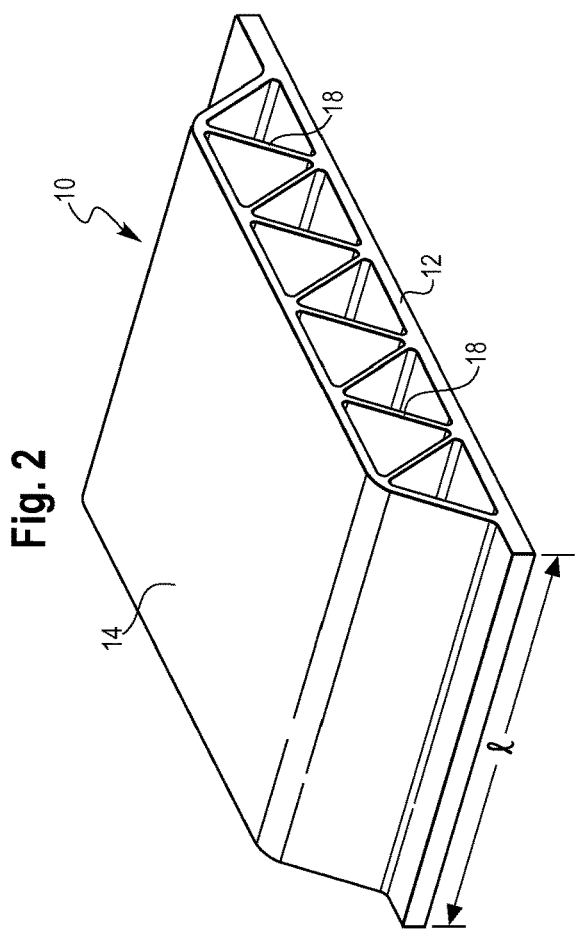

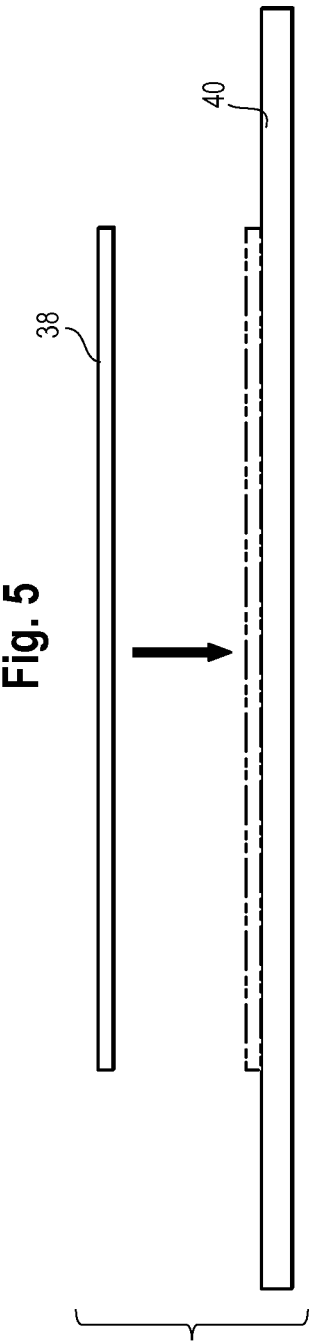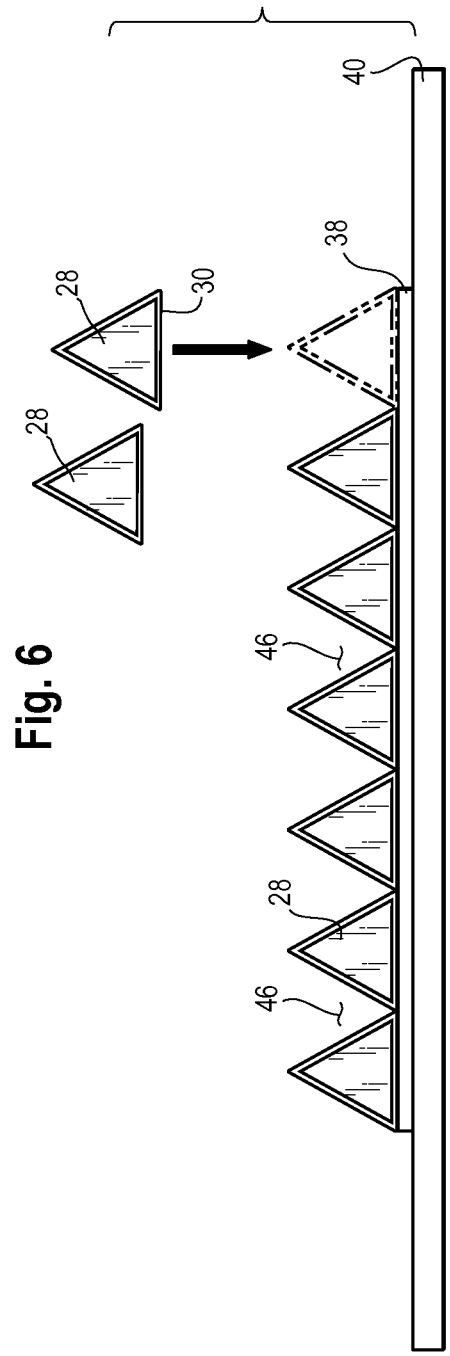

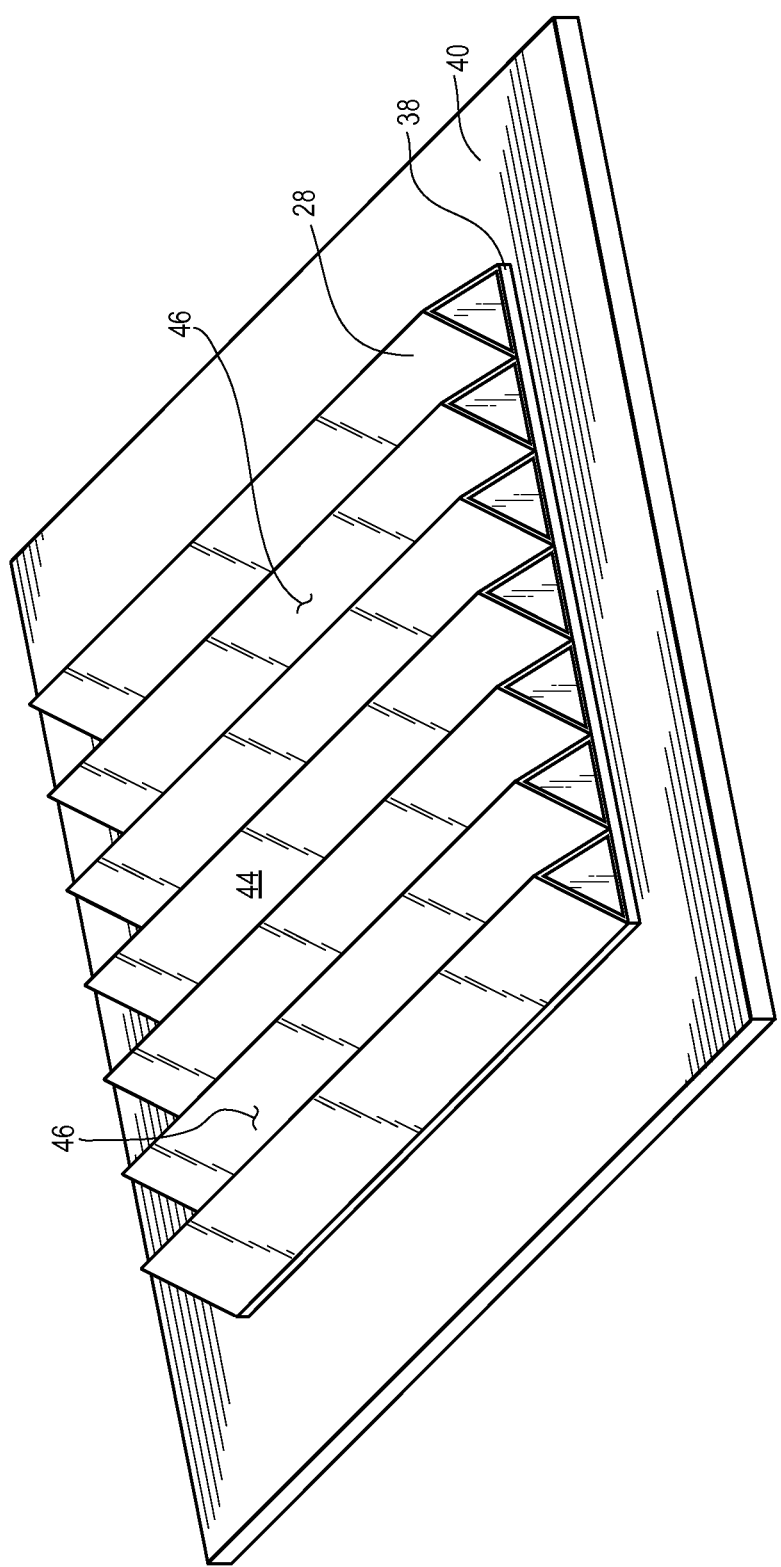

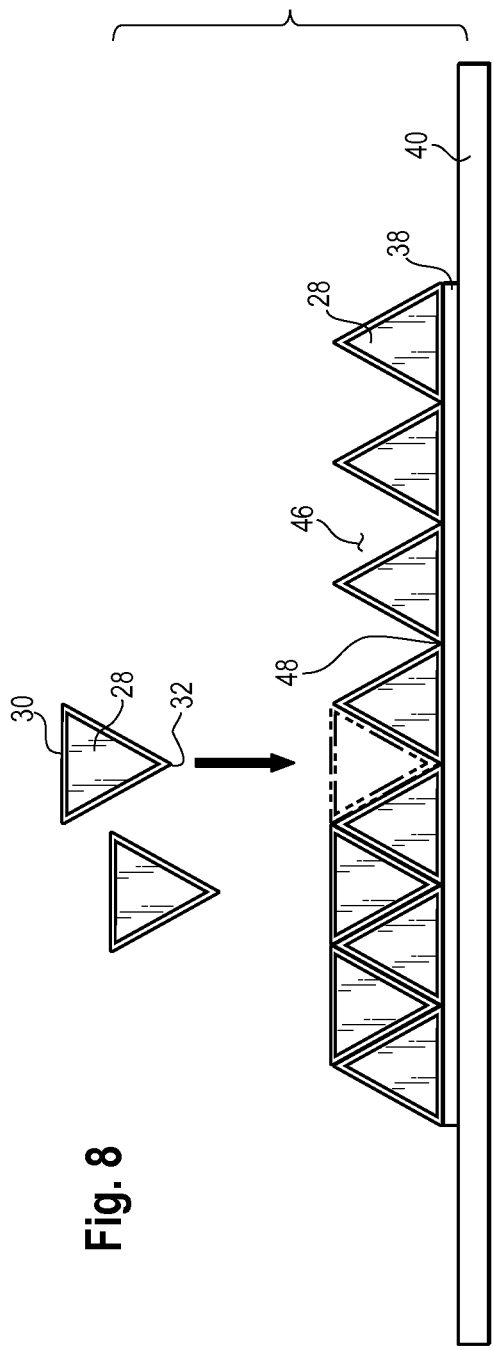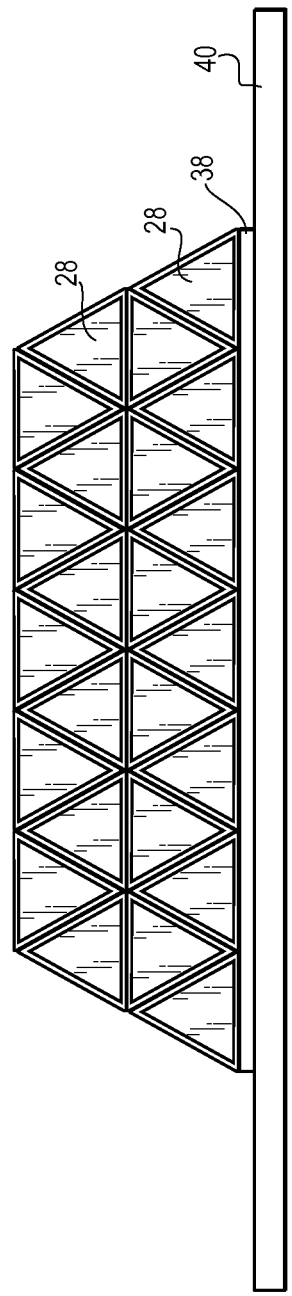

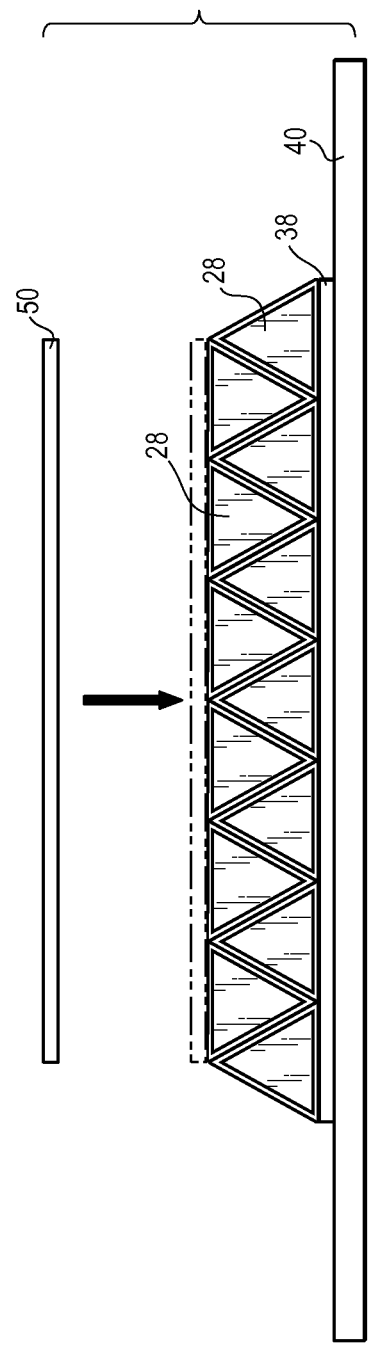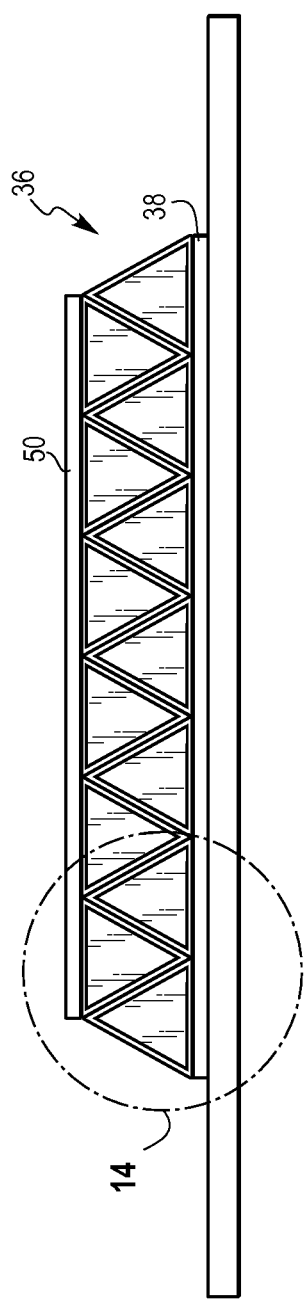

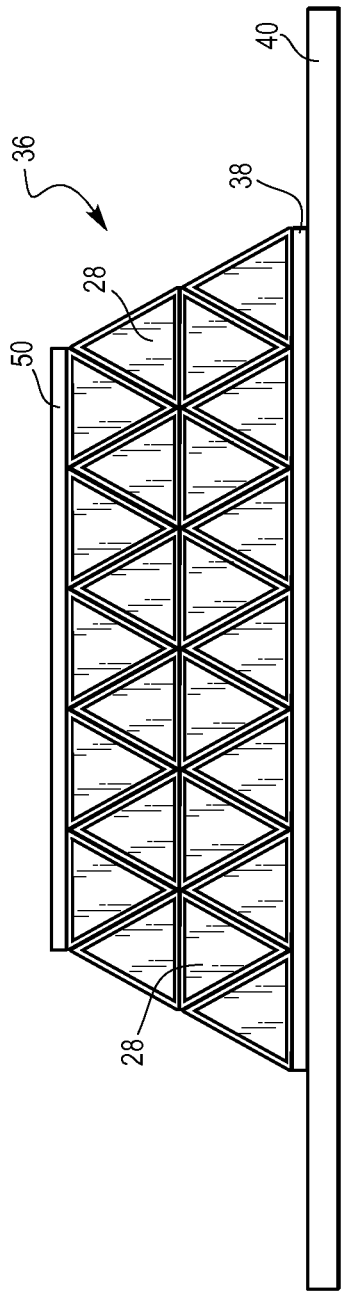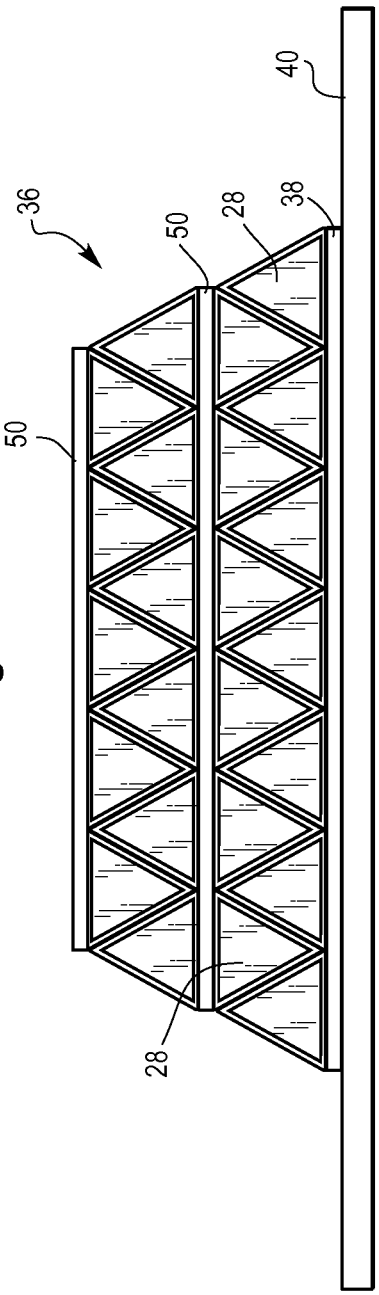

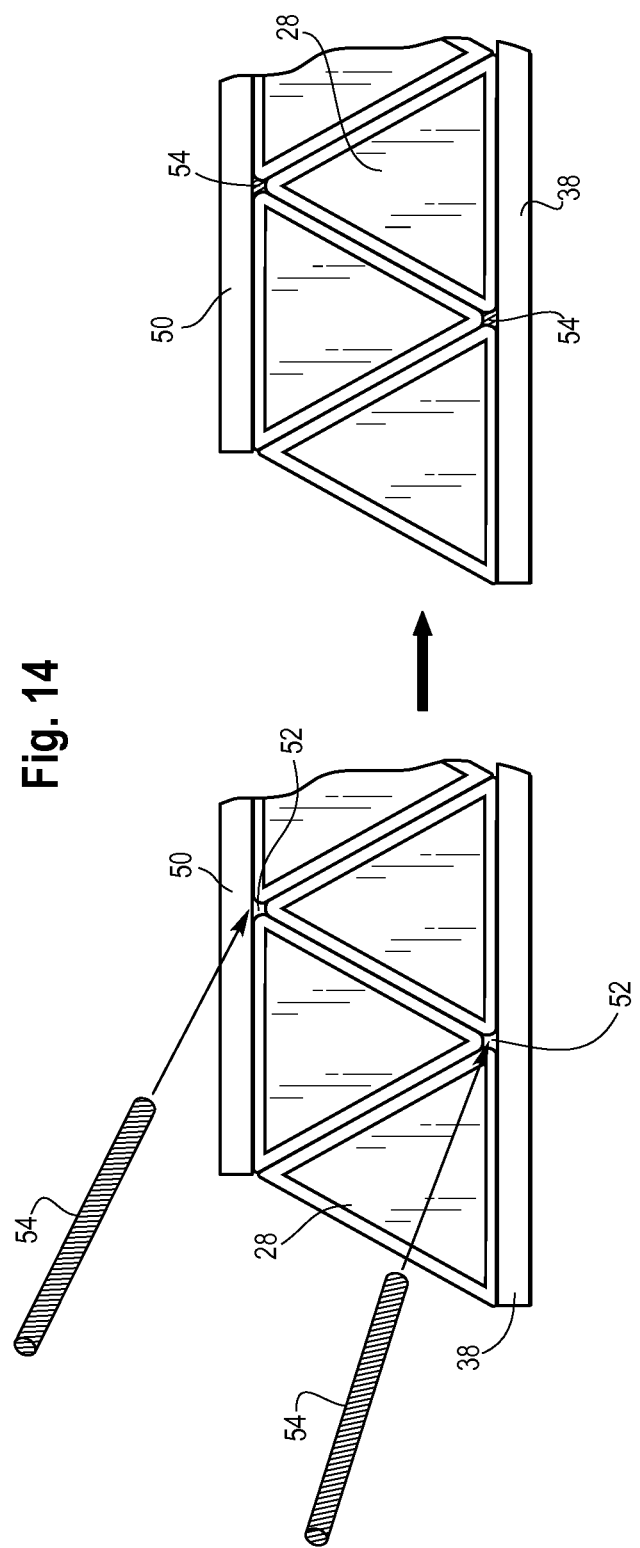

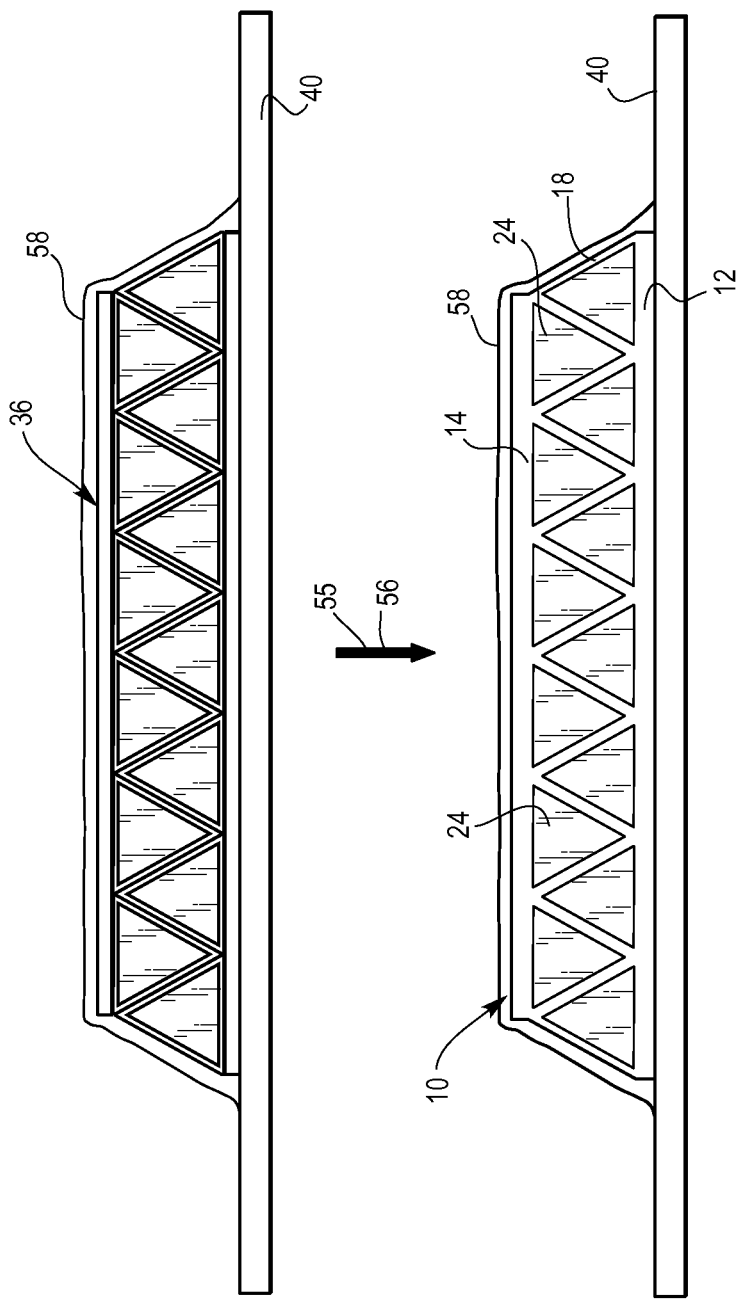

MANUFACTURE OF A RESIN INFUSED ONE-PIECE COMPOSITE TRUSS STRUCTURE

FIELD

The present disclosure generally relates to resin-infused and nonflexible composite truss structures, and more specifically, relates to methods for manufacturing one-piece composite truss structures having two facesheets and a core of truss elements.

BACKGROUND

Fiber-reinforced resin materials are lightweight and high-strength materials that are gaining increasing use for component fabrication in various applications, including aerospace technologies. Fiber-reinforced resin materials are a composite of woven or nonwoven fiber fabric and a resin matrix. In some cases, fiber-reinforced resin materials may be fabricated as structures having intrinsic stiffening capabilities to further extend the strength and durability of any components formed from these materials. Composite sandwich constructions, for example, may consist of a rigid core between two composite facesheets of fiber-reinforced resin. As one example, U.S. Pat. No. 6,508,910 describes composite sandwich constructions formed from a rigid honeycomb core between two facesheets of fiber fabric pre-impregnated with resin (or "prepreg" fabric). While effective, prepreg architectures such as these may require a complex series of manufacturing steps involving multiple curing cycles and debulking steps. In addition, the cutting of honeycomb-stiffened composite sandwich structures into a number of components may be difficult, as any exposed, cut edges of honeycomb units may reduce product durability or may require additional processing.

Truss structures consist of one or more triangular or trapezoidal truss elements connected at "nodes". While truss structures are widely appreciated for their ability to provide a rigid framework in construction applications, it remains a challenge to integrate truss elements as stiffening structures in composite sandwich architectures using efficient manufacturing processes. Although a method for manufacturing flexible composite truss structures with a single facesheet has been described in U.S. Pat. No. 8,651,419, the resulting truss structures disclosed therein requires attachment to a rigid support surface such as an airframe to provide a stiffened structure.

Clearly, there is a need for efficient manufacturing methods that provide access to nonflexible, stiffened composite truss structures for various applications.

SUMMARY

In accordance with one aspect of the present disclosure, a method for fabricating a composite truss structure having a core with a plurality of truss elements is disclosed. The method may comprise preparing a dry fabric mold by placing a first dry fabric layer on a tool having a non-corrugated surface, and placing a first layer of fabric-loaded mandrels on the first dry fabric layer to create a corrugated surface, wherein each of the fabric-loaded mandrels includes a dry fabric tube wrapped around a mandrel. The method may further comprise infusing the dry fabric mold with a resin, and curing the resin to provide the composite truss structure.

In another refinement, preparing the dry fabric mold may further comprise placing a second layer of fabric-loaded mandrels on the first layer of fabric-loaded mandrels by positioning each of the fabric-loaded mandrels of the second layer in a respective one of grooves formed on the corrugated surface.

In another refinement, preparing the dry fabric mold may further comprise placing a second dry fabric layer over the second layer of fabric-loaded mandrels.

In another refinement, preparing the dry fabric mold may further comprise placing one or more additional layers of fabric-loaded mandrels over the second layer of fabric-loaded mandrels, and placing a second dry fabric layer over one or more of the first, second, or additional layers of fabric-loaded mandrels.

In another refinement, the method may further comprise preparing each of the fabric-loaded mandrels by pulling the dry fabric tube over the mandrel or by braiding the dry fabric tube over the mandrel.

In another refinement, the method may further comprise removing the mandrels from the composite truss structure.

In another refinement, removing the mandrels from the composite truss structure may comprise treating the mandrels with a solvent.

In another refinement, the method may further comprise slicing the composite truss structure into a plurality of individual components.

In another refinement, infusing the dry fabric mold with the resin may comprise: 1) placing a vacuum bag over the dry fabric mold, 2) evacuating the vacuum bag, and 3) drawing the resin into the vacuum bag to infuse the dry fabric mold with the resin.

In another refinement, preparing the dry fabric mold may further comprise inserting a filler material in each gap in the dry fabric mold.

In another refinement, each of the fabric-loaded mandrels may have a top and base, and placing the first layer of fabric-loaded mandrels on the first dry fabric layer may comprise placing the base of each of the fabric-loaded mandrels in contact with the first dry fabric layer.

In another refinement, placing the second layer of fabric-loaded mandrels on the first layer of fabric-loaded mandrels may comprise placing the top of each of the fabric-loaded mandrels of the second layer in contact with a bottom of a corresponding one of the grooves formed on the corrugated surface.

In accordance with another aspect of the present disclosure, a composite truss structure is disclosed. The composite truss structure may comprise a first facesheet, a second facesheet, and a reinforcing core between the first facesheet and the second facesheet. The reinforcing core may include a plurality of truss elements each joined with the first facesheet and the second facesheet at nodes to form a one-piece structure. The composite truss structure may be formed by infusion of a dry fabric mold with a resin followed by curing of the resin.

In another refinement, the cured resin may fuse the first facesheet, the second facesheet, and the plurality of truss elements together as the one-piece structure.

In another refinement, the first facesheet and the second facesheet may extend parallel to each other.

In another refinement, the first facesheet and the second facesheet may be angled with respect to each other.

In another refinement, each of the truss elements may be triangular in cross-section.

In another refinement, each of the truss elements may be trapezoidal in cross-section.

In another refinement, each of the truss elements may be rectangular in cross-section.

In accordance with another aspect of the present disclosure, a composite truss structure having a first facesheet, a second facesheet, and a reinforcing core including a plurality of truss elements joined with the first facesheet and the second facesheet to form a unitary structure is disclosed. The composite truss structure may be fabricated by a method comprising preparing a dry fabric mold by: 1) placing a first dry fabric layer on a tool, 2) placing a first layer of fabric-loaded mandrels on the first dry fabric layer to create a corrugated surface, 3) placing a second layer of fabric-loaded mandrels on the first layer of fabric-loaded mandrels by positioning each of the fabric-loaded mandrels of the second layer in a respective one of grooves formed in the corrugated surface, wherein each of the fabric-loaded mandrels of the first layer and the second layer include a dry fabric tube wrapped around a mandrel, and 4) placing a second dry fabric layer over the fabric-loaded mandrels. The method may further comprise infusing the dry fabric mold with a resin, and curing the resin to provide the composite truss structure.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 1 is front view of a composite truss structure, constructed in accordance with the present disclosure.

FIG. 2 is a perspective view of the composite truss structure of FIG. 1.

FIG. 3 is a perspective view of an aerodynamic wedge structure having the composite truss structure, constructed in accordance with the present disclosure.

FIG. 5 is a front view, schematically illustrating the placement of a first dry fabric layer on a tool, in accordance with a method of the present disclosure.

FIG. 6 is a front view, schematically illustrating the placement of a first layer of fabric-loaded mandrels on the first dry fabric layer, in accordance with a method of the present disclosure.

FIG. 7 is a perspective view of a corrugated surface provided by the first layer of fabric-loaded mandrels, constructed in accordance with the present disclosure.

FIG. 8 is a front view, schematically illustrating the placement of a second layer of fabric-loaded mandrels on the first layer of fabric-loaded mandrels, in accordance with a method of the present disclosure.

FIG. 9 is a front view of multiple layers of fabric-loaded mandrels stacked on the first dry fabric layer, constructed in accordance with the present disclosure.

FIG. 10 is a front view, schematically illustrating the placement of a second dry fabric layer over the fabric-loaded mandrels, in accordance with a method of the present disclosure.

FIG. 11 is a front view of a dry fabric mold, constructed in accordance with the present disclosure.

FIG. 12 is a front view of a dry fabric mold similar to FIG. 11, but having a second dry fabric layer placed over multiple layers of fabric-loaded mandrels, constructed in accordance with the present disclosure.

FIG. 13 is a front view similar to FIG. 12, but having second dry fabric layers placed between the layers of fabric-loaded mandrels, constructed in accordance with the present disclosure.

FIG. 14 is a front view of detail 14 of FIG. 11, schematically illustrating the filling of gaps in the dry fabric mold with a filler material, in accordance with a method of the present disclosure.

FIG. 15 is a front view, schematically illustrating resin infusion and curing of the dry fabric mold to provide the composite truss structure, in accordance with a method of the present disclosure.

Figure 4:
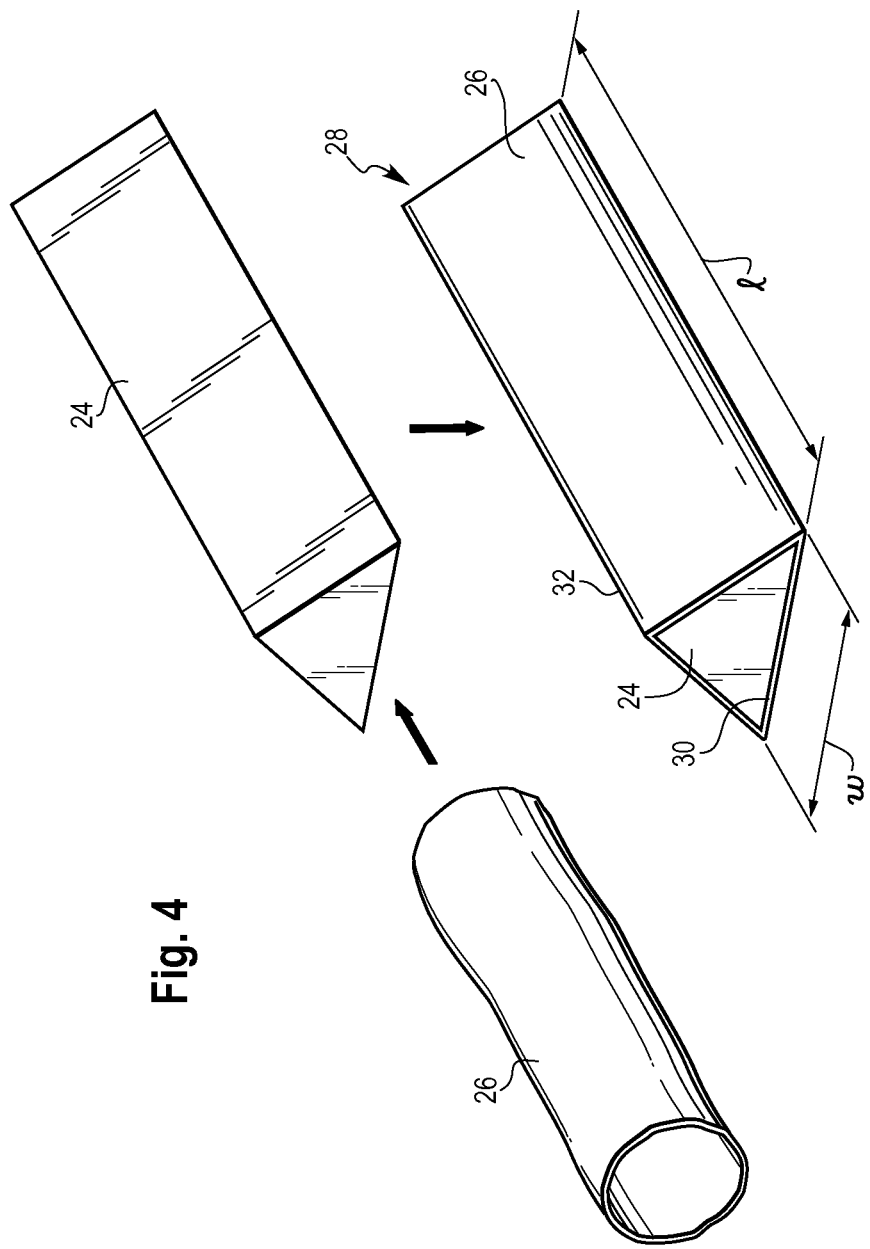
FIG. 4 is a perspective view, schematically illustrating the preparation of a fabric-loaded mandrel, in accordance with a method of the present disclosure.
Figure 17:
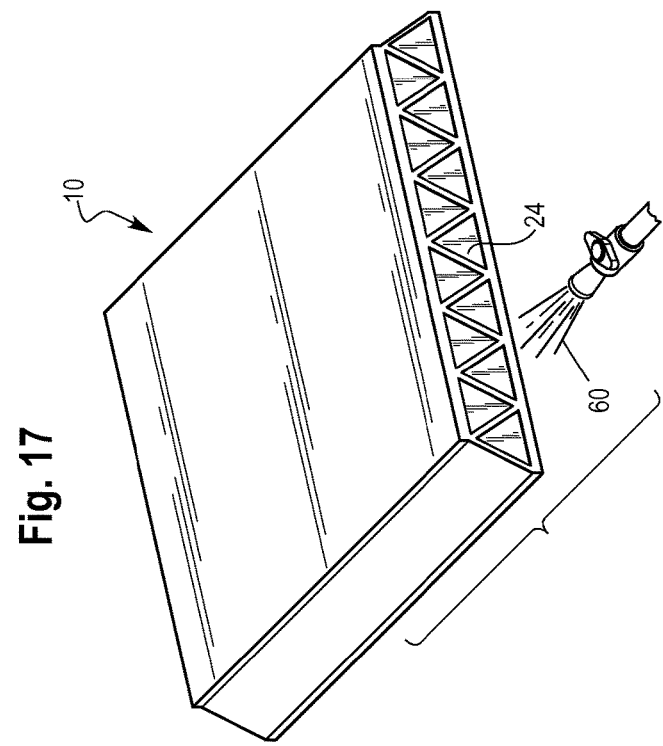
FIG. 17 is a perspective view, schematically illustrating the removal of the mandrels from the composite truss structure by treatment with a solvent, in accordance with a method of the present disclosure.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

Referring now to the drawings, and with specific reference to FIGS. 1 and 2, a nonflexible composite structure 10 is shown. The nonflexible composite structure 10 may have a composite sandwich construction with a first facesheet 12, a second facesheet 14, and a reinforcing core 16 between the first facesheet 12 and the second facesheet 14. The reinforcing core 16 may consist of one or more truss elements 18 that may be fused with the first facesheet 12 and the second facesheet 14 at nodes 20 to provide a one-piece or unitary structure. The truss elements 18 may be aligned and continuous along the length (l) of the composite structure 10, as shown in FIG. 2. The nonflexible composite structure 10 may be stiff by virtue of its two facesheets 12, 14, its reinforcing core 16, as well as its material construction. Given its rigid construction, it may be capable of providing the structural framework for a variety of components without assistance from additional reinforcing elements or support structures. As a non-limiting example, the composite truss structure 10 may provide a rigid framework for various airframe components, although it may be used in other applications as well. Moreover, the composite truss structure 10 may be manufactured more efficiently than comparable composite sandwich structures of the prior art (see additional details below).

The facesheets 12 and 14 may have a smooth and flattened structure, or they may be curved or bent in some regions depending on the application. In addition, the facesheets 12 and 14 may extend parallel to one another, as shown in FIGS. 1 and 2, or they may be angled with respect to one another, as shown by an aerodynamic wedge structure 22 in FIG. 3. Although the truss elements 18 are shown as being triangular in cross-section in FIGS. 1-3, they may have various other shapes as well such as, but not limited to, trapezoidal or rectangular shapes. Furthermore, the truss elements 18 may have sharp edges (see FIGS. 1-3) or rounded edges, and the relative sizes, shapes, and spacings between the truss elements 18 may vary as well.

The composite truss structure 10 may be formed from a fiber-reinforced resin material that may consist of a fabric of woven or nonwoven fibers embedded in a cured resin matrix. The fibers in the fabric may be carbon fibers, glass fibers, aramid fibers, or any other suitable fiber or combinations of fibers. In addition, the cured resin may fuse the facesheets 12 and 14 and the truss elements 18 together to provide the composite truss structure 10 with its one-piece construction (see further details below).

FIGS. 4-18 schematically illustrate a series of steps and intermediate structures that may be involved in the fabrication of components having the nonflexible composite truss structure 10. Starting with FIG. 4, a mandrel 24 having a cross-sectional shape corresponding with the desired truss elements 18 may be wrapped with a dry fabric tube 26 to provide a fabric-loaded mandrel 28, as shown. Wrapping of the mandrel 24 with the dry fabric tube 26 may be achieved by pulling the dry fabric tube 26 over the mandrel 24 tightly to provide a tight-fitting fabric covering that is wrinkle-free or at least substantially wrinkle-free, such that the fabric-loaded mandrel 28 may conform to the shape of the mandrel 24. Alternatively, wrapping of the mandrel 24 with the dry fabric tube 26 may be achieved by braiding a dry fabric tube 26 over the mandrel 24. The dry fabric tube 26 may consist of a fabric of braided or woven fibers that is "dry" (i.e., not pre-impregnated with a resin). If the desired truss elements are triangular in cross-section, the mandrel 24 may have a triangular prism shape, as shown, or it may have other shapes if different types of truss elements are desired. In general, however, the mandrel 24/fabric-loaded mandrel 28 may have a base 30 with a greater width (w) than a top 32, unless of course the mandrel 24 is rectangular in cross-section. Furthermore, the mandrel 24/fabric-loaded mandrel 28 may be straight (i.e., linear) or curved/bent (i.e., non-linear) along its length (l). The mandrel 24 may be formed from a solid material such as a metallic material, or it may be formed from a solid soluble material such that it may be removed from the composite truss structure 10 by treatment with a suitable solvent as described in further detail below. In any event, the mandrel-loading step depicted in FIG. 4 may be repeated as needed to provide a required number of fabric-loaded mandrels 28 for the fabric molding procedure discussed below.

FIGS. 5-14 depict a series of steps and intermediate structures that may be involved in preparing a dry fabric mold 36 (see FIG. 11) which may provide the fabric skeleton of the composite truss structure 10. As shown in FIG. 5, one or more first dry fabric layers 38 may first be placed on a tool 40 that may have a non-corrugated surface which may be smooth and flat, gradually curved, or even abruptly bent at certain locations depending on the structure of the desired component. The first dry fabric layer 38 may consist of one or more layers of woven or nonwoven fiber fabric that is dry or not pre-impregnated with a resin, and it may provide the fabric skeleton of the first facesheet 12.

In order to form the fabric skeleton of the truss elements 18, a first layer of fabric-loaded mandrels 28 may be placed on the first dry fabric layer 38, as shown in FIG. 6. More specifically, the bases 30 of each of the fabric-loaded mandrels 28 may be placed in contact with the first dry fabric layer 38 such that the first layer of fabric-loaded mandrels 28 creates a corrugated surface 44 with grooves 46, as best shown in FIG. 7. As a non-limiting possibility, the fabric-loaded mandrels 28 may be aligned in abutment and in parallel such that the grooves 46 may extend parallel to each other, as shown. However, other configurations are certainly possible, particularly when using curved or bent mandrels.

Turning now to FIG. 8, a next step involved in forming the fabric skeleton of the truss elements 18 may involve placing a second layer of fabric-loaded mandrels 28 on the first layer of fabric loaded mandrels 28 by positioning each of the fabric-loaded mandrels 28 of the second layer in a respective one of the grooves 46. More specifically, the top 32 of each fabric-loaded mandrel 28 of the second layer may be placed in contact with or at least oriented toward a bottom 48 of each groove 46, such that the base 30 of each fabric-loaded mandrel 28 of the second layer may be oriented upward to provide a flat or substantially flat surface. In this way, the second layer of fabric-loaded mandrels 28 may be interdigitated with the first layer of fabric-loaded mandrels 28. Optionally, additional layers of the fabric-loaded mandrels 28 may be stacked on the first and second layers of the fabric-loaded mandrels 28 according to the steps depicted in FIGS. 6 and 8 to provide a core with additional truss elements (see FIG. 9).

After building-up the desired number of layers of the fabric-loaded mandrels 28, one or more second dry fabric layers 50 may be placed over the fabric-loaded mandrels 28 to provide the dry fabric mold 36, as shown in FIGS. 10-11. If more than two layers of fabric-loaded mandrels 28 are used, one or more second dry fabric layers 50 may be placed over all of the layers of fabric-loaded mandrels 28, as shown by example in FIG. 12, or one or more second dry fabric layers 50 may be placed at desired positions between the layers of fabric-loaded mandrels 28, as shown by example in FIG. 13. The second dry fabric layer 50 may provide the fabric skeleton of the second facesheet 14 and it may consist of one or more layers of woven or nonwoven fiber fabric that is dry or not pre-impregnated with resin. However, in some arrangements, the second dry fabric layer 50 may be eliminated from the dry fabric mold 36 when only a single facesheet in the composite truss structure is desired.

If any gaps 52 are present in the dry fabric mold 36, such as between the fabric-loaded mandrels 28 and either or both of the dry fabric layers 38 and 50, a filler material 54 may optionally be inserted in each of the gaps 52 to provide a more compact mold (see FIG. 14). The filler material 54 may be formed from dry fiber fabric and it may have any shape suitable to fill the gaps 52. As a non-limiting example, the filler material(s) 54 may have a tubular shape configured to fill any gap(s) 52 extending along the length (l) of the fiber-loaded mandrels 28 and located between the fiber-loaded mandrels 28 and either or both of the dry fabric layers 38 and 50.

Referring now to FIG. 15, once the dry fabric mold 36 is prepared and any optional filler material(s) 54 are installed, the dry fabric mold 36 may first be infused with resin by a resin infusion process 55, and then subjected to a curing process 56. The resin infusion process 55 may be carried out by placing the dry fabric mold 36 and the tool 40 in a vacuum bag 58, evacuating the vacuum bag 58, and drawing resin into the vacuum bag 58 with vacuum pressure to cause the dry fabric mold 36 to become infused with the resin. The curing process 56 may then be carried out by heating the vacuum bag 58 carrying the resin-infused dry fabric mold 36 in an oven at a suitable temperature and pressure to cause the resin to cure to a hardened state. However, the curing process 56 may be carried out in the absence of heat as well. During the curing process, the resin-infused fabric may be fused together as a single unit to provide the composite truss structure 10 having the first facesheet 12, the second facesheet 14, and the truss elements 18 integrated as one-piece.

Figure 16:
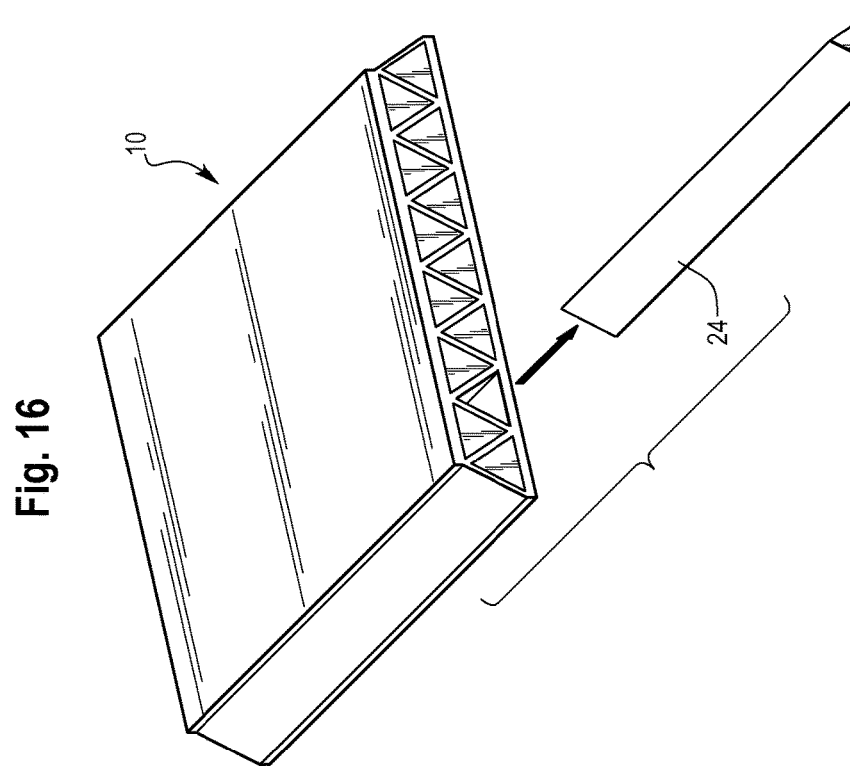
FIG. 16 is a perspective view, schematically illustrating the removal of the mandrels from the composite truss structure, in accordance with a method of the present disclosure.

After removing the cured composite truss structure 10 from the vacuum bag 58, the mandrels 24 may be removed from the composite truss structure 10 using a tool, or they may be pulled or pushed out manually from the composite truss structure 10, as depicted in FIG. 16. Alternatively, if the mandrels 24 are soluble mandrels, they may be dissolved by treating the mandrels 24 with a solvent 60 that is capable of dissolving the mandrels 24 without significantly disturbing the integrity of the composite truss structure 10 (see FIG. 17). As one possibility, the solvent 60 may be water if the mandrels 24 are water soluble, although other suitable solvents may also be used. Notably, the use of soluble mandrels may improve the ease of removing mandrels 24 from composite truss structures having angled facesheets (see FIG. 3, for example) and/or otherwise closed arrangements in which access to the mandrels 24 may be hindered by the facesheets.

Figure 18:
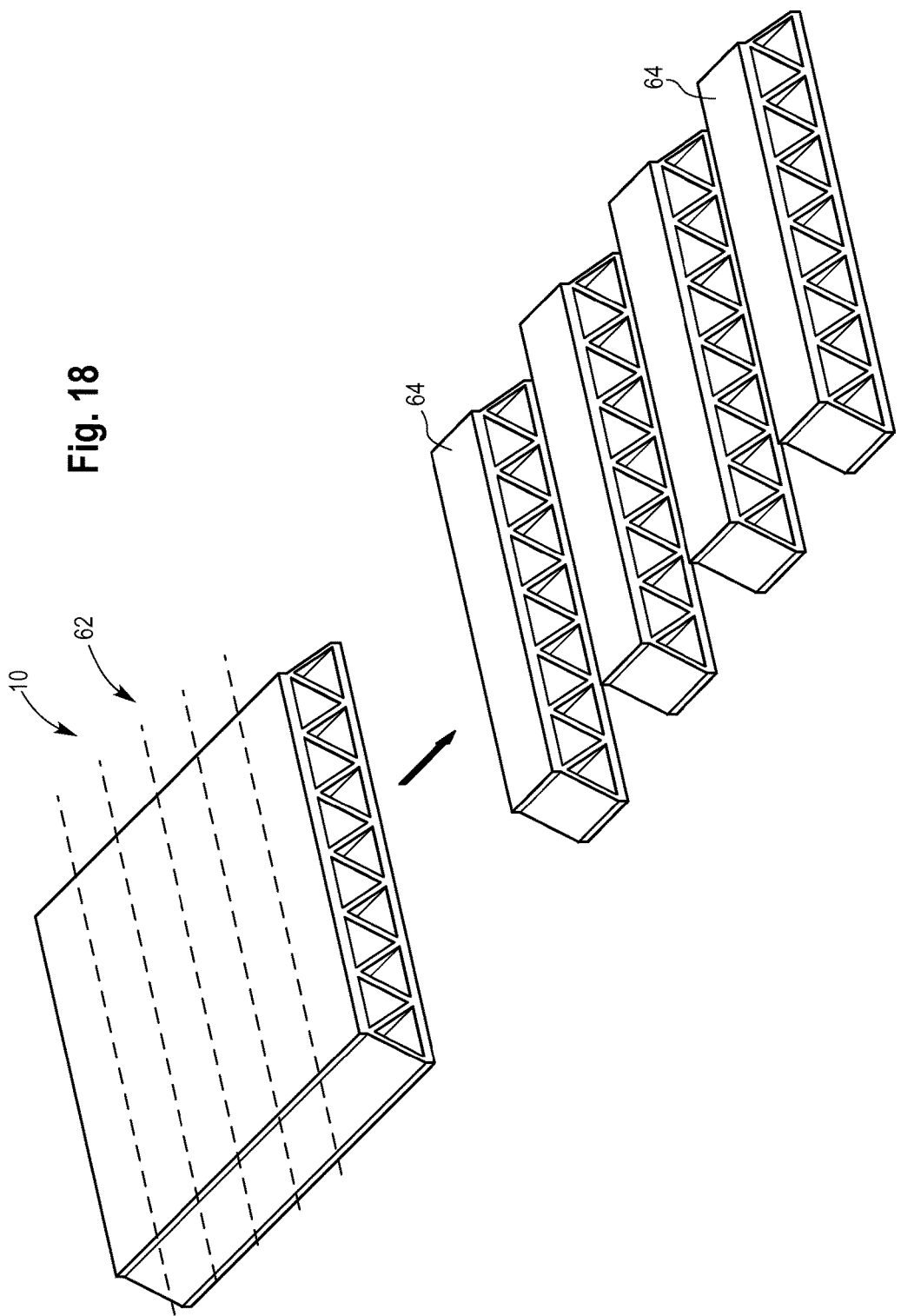
FIG. 18 is a perspective view, schematically illustrating slicing of the composite truss structure into individual components, in accordance with a method of the present disclosure.

The resulting composite truss structure 10 may be formed as a larger panel 62 that may be sliced or cut as needed to provide a desired number of individual components 64, as schematically depicted in FIG. 18. In this regard, the dimensions of the panel 62 may scaled as needed according to the dimensions of the component(s) 64 as well as the desired number of components. As will be appreciated, the rate of production of the components 64 may be markedly improved by cutting the components 64 from the larger panel 62, as opposed to molding the components 64 individually.

Figure 19:
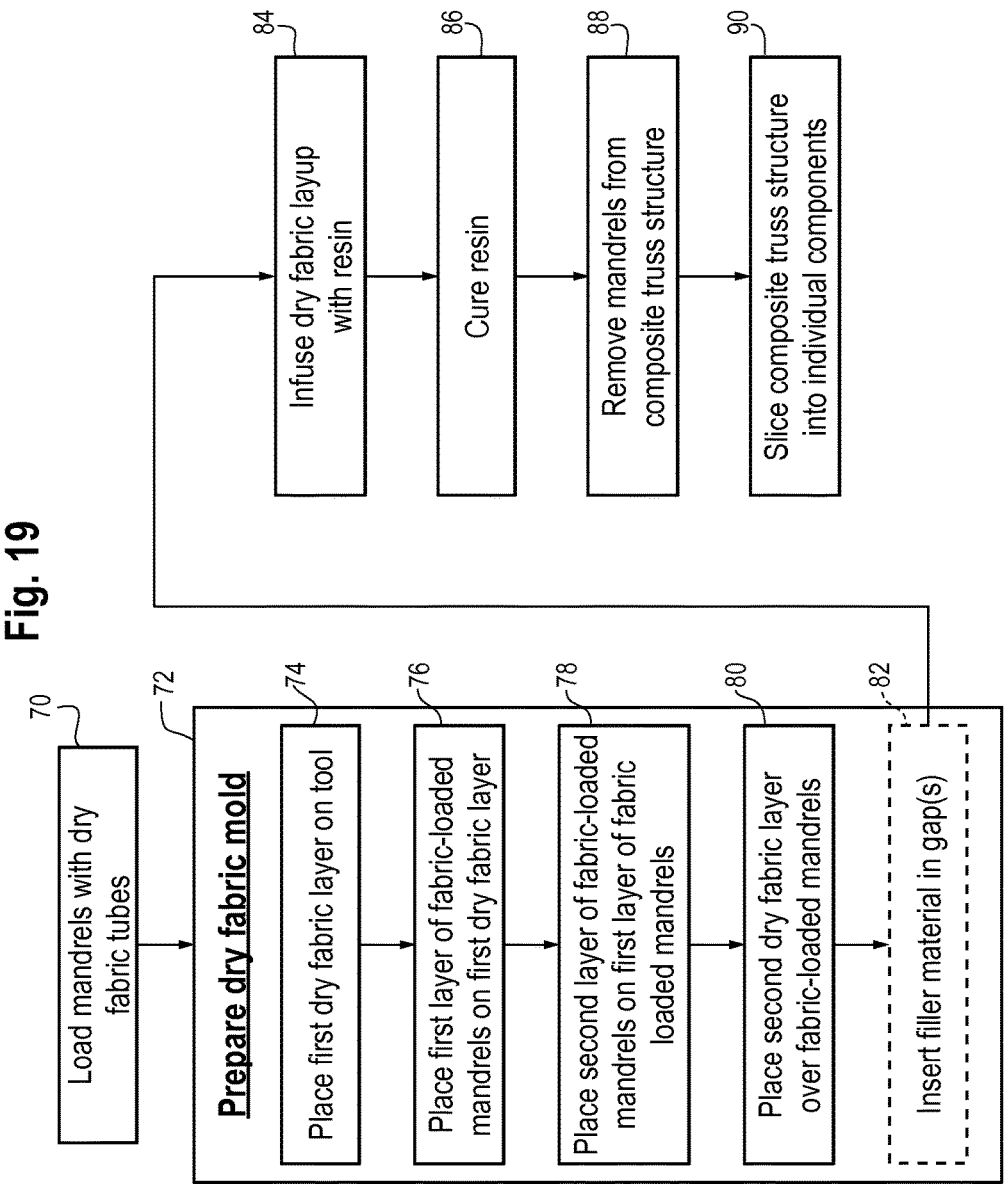
FIG. 19 is a flowchart illustrating a sample sequence of steps which may be involved in the manufacture of components having the composite truss structure, in accordance with a method of the present disclosure.

FIG. 19 summarizes the steps that may be involved in manufacturing components with the composite truss structure 10. Beginning with a first block 70, one or more mandrels 24 may be loaded with a dry fabric tube 26 to provide a desired number of fabric-loaded mandrels 28, as shown in FIG. 4 and described above. With the fabric-loaded mandrels 28 at hand, the dry fabric mold 36 may be prepared according to a block 72. The block 72 may involve: 1) placing the first dry fabric layer 38 on the tool 40 (block 74/FIG. 5), 2) placing a first layer of fabric-loaded mandrels 28 on the first dry fabric layer 38 to form the corrugated surface 44 (block 76/FIGS. 6 and 7), 3) placing a second layer of fabric-loaded mandrels 28 on the first layer of the fabric-loaded mandrels 28 (block 78/FIG. 8), and 4) placing a second dry fabric layer 50 over the fabric-loaded mandrels 28 (block 80/FIG. 10). However, additional layers of fabric-loaded mandrels 28 (i.e., more than two) may be stacked on the first two layers by repeating the blocks 76/78 as desired prior to the block 80 (see FIG. 9). If more than two layers of fabric-loaded mandrels 28 are used, a second dry fabric layer 50 may be placed over multiple layers of fabric-loaded mandrels 28 (see FIG. 12), or one or more second dry fabric layers 50 may be placed at desired positions between layers of fabric-loaded mandrels (see FIG. 13). In addition, a single layer of the fabric-loaded mandrels 28 may be used to mold the truss elements 18, in which case the block 78 may be eliminated. It is also noted that the block 80 may be eliminated in cases where only a single facesheet is desired in the final product. Optionally, the block 72 may further involve inserting one or more of the filler material(s) 54 in any gaps 52 remaining in the dry fabric mold 36 (block 82/FIG. 14).

According to a next block 84, the dry fabric mold 36 may be infused with resin by the resin infusion process 55 as described in detail above. The resin-infused molded fabric may then be cured to provide the composite truss structure 10 formed as a larger panel 62 according to a next block 86 (also see FIG. 15). The mandrels 24 may then be removed from the composite truss structure 10 by tool-assisted removal, manual removal, or by treatment with a solvent if the mandrels 24 are soluble (block 88/FIGS. 16-17). Lastly, the composite truss structure 10 may be sliced or cut into individual components 64 having desired dimensions (block 90/FIG. 18). In some cases, the component(s) 64 cut from the panel 62 may form portions of a larger, complete component, such that the components 64 may be further assembled with additional components to provide the complete component.

INDUSTRIAL APPLICABILITY

In general, it can therefore be seen that the technology disclosed herein has industrial applicability in a variety of settings including, but not limited to, manufacturing of composite truss structures for aerospace applications or other industrial applications. The composite truss structures disclosed herein may have strengths comparable with honeycomb-stiffened composite sandwich structures of the prior art, but they may be manufactured in significantly fewer steps. In particular, the use of mandrels to mold dry fiber fabrics into the shape of a complex truss structure permits the application of a single resin infusion step and a single curing step to provide a fused, one-piece composite structure. In this way, the multiple curing stages and hot debulking steps that are characteristic of prepreg manufacturing methods of the prior art are avoided and the ease and efficiency of accessing complex composite truss structures for various industrial applications may be markedly improved. Moreover, while the nonflexible composite truss structure disclosed herein could conceivably be fabricated using carbon fabric prepregs instead of dry fabric material, prepreg material is typically only available as flat sheets (not tubes), such that the covering of truss element-shaped mandrels may require a wrapping type process in which the mandrels are rolled-up in the carbon prepreg layers and overlapped at the edges. As a result, this alternative method may be susceptible to wrinkling and may require additional hot debulking steps to smooth out the joints and/or wrinkles in the carbon prepreg layers. In contrast, the method disclosed herein employs dry fabric braided tubes that may be compressed and stretched over the mandrel to provide a tight fit that requires no hot debulking. In addition, the molding of the composite truss with dry fiber fabric may be a more cost-effective approach, as carbon prepregs are generally more expensive than dry fiber fabric. It is expected that the technology disclosed herein may find wide industrial applicability in a wide range of areas such as, but not limited to, aerospace applications.

What is claimed is:

1. A method for fabricating a composite truss structure having a core with a plurality of truss elements, comprising: preparing a dry fabric mold by a method comprising placing a first dry fabric layer on a tool having a non-corrugated surface, and placing a first layer of fabric-loaded mandrels on the first dry fabric layer to create a corrugated surface, each of the fabric-loaded mandrels having a major axis and including a dry fabric tube wrapped around a mandrel, the first layer of fabric-loaded mandrels including a row of the fabric-loaded mandrels aligned in abutment and in parallel along the major axes of the fabric-loaded mandrels, each of the fabric-loaded mandrels of the row having a same cross-sectional shape that becomes progressively smaller across the row to provide a wedge structure;

infusing the dry fabric mold with a resin;

curing the resin to provide the composite truss structure; and repeatedly slicing the composite truss structure along an axis perpendicular to the major axes to provide a plurality of individual components each having the composite truss structure.

2. The method of claim 1, wherein preparing the dry fabric mold further comprises placing a second layer of fabric-loaded mandrels on the first layer of fabric-loaded mandrels by positioning each of the fabric-loaded mandrels of the second layer in a respective one of grooves formed on the corrugated surface, the second layer of fabric-loaded mandrels including a second row of the fabric-loaded mandrels aligned in abutment and in parallel along the major axes of the fabric-loaded mandrels, each of the fabric-loaded mandrels of the second row having a same cross-sectional shape that becomes progressively smaller across the second row to provide the wedge structure.

3. The method of claim 2, wherein preparing the dry fabric mold further comprises placing a second dry fabric layer over the second layer of fabric-loaded mandrels.

4. The method of claim 3, further comprising preparing each of the fabric-loaded mandrels by pulling the dry fabric tube over the mandrel or by braiding the dry fabric tube over the mandrel.

5. The method of claim 3, further comprising removing the mandrels from the composite truss structure after curing the resin to provide the composite truss structure.

6. The method of claim 5, wherein removing the mandrels from the composite truss structure comprises treating the mandrels with a solvent.

7. The method of claim 5, wherein preparing the dry fabric mold further comprises inserting a filler material in each gap in the dry fabric mold.

8. The method of claim 5, wherein each of the fabric-loaded mandrels has a top and a base, and wherein placing the first layer of fabric-loaded mandrels on the first dry fabric layer comprises placing the base of each of the fabric-loaded mandrels in contact with the first dry fabric layer.

9. The method of claim 8, wherein placing the second layer of fabric-loaded mandrels on the first layer of fabric-loaded mandrels comprises placing the top of each of the fabric-loaded mandrels of the second layer in contact with a bottom of a respective one of the grooves formed on the corrugated surface.

10. The method of claim 1, wherein preparing the dry fabric mold further comprises:

placing additional layers of fabric-loaded mandrels over the first layer of fabric-loaded mandrels; and placing a plurality of dry fabric layers at desired locations between the layers of fabric-loaded mandrels.

11. The method of claim 1, wherein repeatedly slicing the composite truss structure along an axis parallel to the major axes to provide a plurality of individual components each having the composite truss structure comprises repeatedly slicing the entire composite truss structure into the plurality of individual components.

12. A method for fabricating a number of individual components each having a nonflexible composite truss structure formed from a fiber-reinforced resin material and having a first facesheet, a second facesheet, and a reinforcing core of truss elements fused with the first facesheet and the second facesheet, the method comprising:

preparing a dry fabric mold by a method comprising placing a first dry fabric layer on a tool, placing a first layer of fabric-loaded mandrels on the first dry fabric layer to create a corrugated surface having a plurality of grooves, placing a second layer of fabric-loaded mandrels on the first layer of fabric-loaded mandrels by positioning each of the fabric-loaded mandrels of the second layer in a respective one of the grooves of the corrugated surface, each of the fabric-loaded mandrels of the first layer and the second layer having a major axis and including a dry fabric tube wrapped around a mandrel, each of the first layer and the second layer including a row of the fabric-loaded mandrels aligned in abutment and in parallel along the major axes of the fabric-loaded mandrels, each of the fabric-loaded mandrels of the row having a same cross-sectional shape that becomes progressively smaller across the row to provide a wedge structure, and placing a second dry fabric layer over the fabric-loaded mandrels;

infusing the dry fabric mold with a resin;

curing the resin to provide a larger panel having the composite truss structure, the larger panel being sized to provide the number of individual components; and repeatedly slicing the larger panel along an axis perpendicular to the major axes to provide the number of individual components each having the nonflexible composite truss structure.

13. The method of claim 12, wherein each of the fabric-loaded mandrels include a top and a base that is wider than the top, and wherein placing the first layer of fabric-loaded mandrels on the first dry fabric layer further comprises aligning the fabric-loaded mandrels in parallel on the first dry fabric layer with the base of each fabric-loaded mandrel contacting the first dry fabric layer.

14. The method of claim 13, wherein placing the second layer of fabric-loaded mandrels on the first layer of fabric-loaded mandrels further comprises inserting the top of each of the fabric-loaded mandrels of the second layer into a respective one of the grooves of the corrugated surface.

15. The method of claim 14, further comprising preparing each of the fabric-loaded mandrels by pulling the dry fabric tube over the mandrel.

16. The method of claim 14, further comprising preparing each of the fabric-loaded mandrels by braiding the dry fabric tube over the mandrel.

17. The method of claim 14, further comprising removing the mandrels from the composite truss structure after curing the resin.

18. The method of claim 17, wherein removing the mandrels from the composite truss structure comprises treating the mandrels with a solvent.

19. The method of claim 17, wherein the mandrels are water-soluble, and wherein removing the mandrels from the composite truss structure comprises treating the mandrels with water.

20. A method for fabricating a composite truss structure having a first facesheet, a second facesheet, and a reinforcing core of truss elements fused with the first facesheet and the second facesheet, the method comprising:

preparing a dry fabric mold by a method comprising
        placing a first dry fabric layer on a flat tool,
        aligning a first layer of fabric-loaded mandrels on the first dry fabric layer to provide a corrugated surface having a plurality of parallel grooves, each of the fabric-loaded mandrels having a major axis and including a dry fabric tube wrapped around a mandrel having a top and a base that is wider than the top, the first layer of fabric-loaded mandrels including a row of the fabric-loaded mandrels aligned in abutment and in parallel along the major axes of the fabric-loaded mandrels, each of the fabric-loaded mandrels of the row having a same cross-sectional shape that becomes progressively smaller across the row,
        placing a second layer of fabric-loaded mandrels on the first layer of fabric-loaded mandrels by inserting the top of each of the fabric-loaded mandrels of the second layer in a respective one of the parallel grooves, the second layer of fabric-loaded mandrels including a second row of the fabric-loaded mandrels aligned in abutment and in parallel along the major axes of the fabric-loaded mandrels, each of the fabric-loaded mandrels of the second row having a same cross-sectional shape that becomes progressively smaller across the second row, and
        placing a second dry fabric layer over the fabric-loaded mandrels to provide the dry fabric mold, the first and second dry fabric layers being planar and tapering toward each other to a point to provide a wedge structure, the dry fabric mold providing a fabric skeleton for the composite truss structure;
    infusing the dry fabric mold with a resin;
    curing the resin to provide the composite truss structure;
    removing the mandrels to provide cavities in the composite truss structure, the cavities having the same cross-sectional shape as the mandrels; and
    repeatedly slicing the composite truss structure through the cavities to provide a plurality of individual components having the composite truss structure.

21. The method of claim 20, wherein the mandrels are removed manually or by tool-assisted removal.

* * * * *